United States Patent [19]

Gibson

[11] Patent Number: 4,999,204

[45] Date of Patent: Mar. 12, 1991

[54] HELICALLY SHAPED MEAT PRODUCT

[75] Inventor: Royce G. Gibson, South Wales, Australia

[73] Assignee: Tendapak Technologies PTY Ltd., Redfern, Australia

[21] Appl. No.: 393,919

[22] PCT Filed: Dec. 4, 1987

[86] PCT No.: PCT/AU87/00413

§ 371 Date: Jul. 24, 1989

§ 102(e) Date: Jul. 24, 1989

[87] PCT Pub. No.: WO88/04142

PCT Pub. Date: Jun. 16, 1988

[30] Foreign Application Priority Data

Dec. 5, 1986 [AU] Australia .............................. PH 9357

[51] Int. Cl.⁵ ............................................. A23L 1/311
[52] U.S. Cl. .................................... 426/104; 426/641; 426/646
[58] Field of Search ............... 426/104, 641, 645, 646, 426/513; 99/538

[56] References Cited

U.S. PATENT DOCUMENTS

| | | |
|---|---|---|
| 3,852,487 | 12/1974 | Van Werven et al. . |
| 4,387,111 | 6/1983 | Mullender ........................ 426/104 X |
| 4,820,535 | 4/1989 | Gibson ............................. 426/513 X |
| 4,821,635 | 4/1989 | Logan ..................................... 99/538 |

FOREIGN PATENT DOCUMENTS

| | | |
|---|---|---|
| 70/19235 | 8/1970 | Australia . |
| 71/29961 | 6/1971 | Australia . |
| 85/05538 | 12/1985 | PCT Int'l Appl. . |
| 86/07240 | 12/1986 | PCT Int'l Appl. . |

Primary Examiner—Arthur L. Corbin
Attorney, Agent, or Firm—Browdy and Neimark

[57] ABSTRACT

A reconstituted meat product comprising a plurality of meat pieces agglomerated together, wherein the meat pieces are of an elongate shape and are arranged in a substantially helical array through the meat product. The helical arrangement of the meat pieces aids in binding the meat pieces and gives to the reconstituted product a natural appearance.

6 Claims, 1 Drawing Sheet

HELICALLY SHAPED MEAT PRODUCT

FIELD OF THE INVENTION

The present invention relates to an improved reconstituted meat product and more particularly to a reconstituted meat product which may be severed to produce steak-like pieces.

BACKGROUND OF THE INVENTION

Many efforts have been made in the past to agglomerate together small meat pieces to produce a reconstituted meat product having the qualities of a piece of primal meat. Primal meat generally has longitudinally extending muscle fibres. In the formation of steak-like products it is normal to cut across these longitudinally extending muscle fibres. In the formation of reconstituted meat products it has been proposed previously to orientate the fibres of the meat particles in a given direction and then to cut across the direction of those fibres in an effort to produce a product approximating that of natural primal meat (see for example Australian patent specification 19235/70 and 29961/71). These efforts have been unsuccessful in that the meat products so formed fail to show the coherence exhibited by natural meat products though they do have desirable fibrous properties. In order to cause these products to cohere adequately it has previously been proposed either to add binders of various types to the reconstituted product such as salt, or to encase the reconstituted product in a natural or synthetic skin to hold the product together (see for example U.S. Pat. No. 3852487). These binders have improved the cohesion of the comminuted meat pieces together, however they often impart their own adverse properties to the finished product or detract from its appearance. Thus salt is now considered to adversely affect health and is preferably avoided in large amounts. Similarly, large quantities of finely ground meat emulsion binder included in reformed meat products can give the product an unnatural colour and/or texture. Thus at the date of this invention it was known to produce textured products without good adhesion and to produce reasonably well cohered products without texture. It was not, however, possible to produce a product having both desirable qualities simultaneously.

SUMMARY OF THE INVENTION

The present inventor has realized that by forming a reconstituted product of meat particles which are elongated in form and by arranging those meat particles in a substantially helical array through the meat product one may achieve a product having good physical coherence and a natural textured appearance even though the structure of the reconstituted product is from a theoretical point of view quite different from that of natural meat.

The present invention accordingly consists in a meat product comprising a plurality of meat pieces agglomerated together, characterized in that the meat pieces are elongate in form and arranged in a substantially helical array through the meat product.

It should be pointed out at this juncture that each piece of meat will be made up of a number of meat fibres and the fibres of the meat pieces do not themselves need to be arrayed in any particular way but rather the meat pieces should be elongated or stretched out such that in the meat product they are arranged in a substantially helical array.

The meat product is preferably formed in a cylindrical shape having a longitudinal axis. The meat pieces are preferably arranged in a substantially helical array around that longitudinal axis. If the meat product is to be formed into steak-like pieces these steak-like pieces are preferably cut from the cylindrical meat product at right angles to the longitudinal axis of the meat product such that the meat pieces in the steak-like article will themselves traverse that article in a substantially helical fashion. The helical array of the meat pieces is believed to substantially improve the coherence of the reconstituted meat product as compared with any previously known reconstituted meat product.

It will be recognized that the products according to this invention do not need to be cylindrical or circular in shape. Other shaped products may be readily produced and are encompassed within this invention provided the meat pieces are arranged in a generally helical array.

In preferred embodiments of the invention from 40 to 70% of the number of meat pieces in the meat product are so arranged in the meat product that they have a minimum angle of from 10° to 50° relative to the axis of the helical array when seen at right-angles to that axis and with the meat pieces appearing to traverse that axis.

Preferably the meat pieces have a length of from 10 millimetres to 100 millimetres and a transverse dimension of from 2 millimetres to 70 millimetres. The elongated meat particles may be used on their own to form the meat product or they may be mixed together with finely comminuted meat material which is not itself elongated. The finely comminuted meat material may comprise meat which contains sinews such that the sinews are rendered substantially organoleptically undetectable by the comminution of the original meat material.

In a particularly preferred embodiment of the present invention the surface of the individual meat pieces are rubbed or otherwise roughened prior to being agglomerated together to increase their natural coherence.

The formation of a rubbed or otherwise roughened surface on the meat pieces is preferably achieved by passage of the meat pieces through the counter-rotating knives described in PCT patent specification PCT/AU86/00163, now U.S. Pat. No. 4,815,165. The roughening could however be produced by merely mixing the meat pieces together for a prolonged period. The latter course of action however is disadvantageous in that it tends to give the meat an unduly dry texture.

The meat products according to this invention are preferably produced in the apparatus described in PCT patent application PCT/AU86/00163 however other mechanisms could be used to achieve a similar result. The contents of PCT patent specification PCT/AU86/00163 are incorporated herein by reference. Other machines and methods may, however, be used to produce the product according to this invention. The meat pieces may be fed manually into a suitable container while combining the meat pieces into the desired array. In another alternative the extrusion machine according to Australian Patent Specifications 451786 or 452429 may be adapted provided that the product produced thereby is fed into a container which is caused to rotate about its longitudinal axis to induce the meat particles to achieve a helical array rather than an array parallel to the direction of extrusion.

It is of the essence of the present invention that the meat be raw at the time of the formation of the meat product and it is desirable that once formed the meat product is frozen. Preferably, the meat is directed cooked from the frozen state although it may thawed and cooked from a thawed state. The meat may be the muscle derived from any suitable mammalian or avian species of animal.

DESCRIPTION OF THE PREFERRED EMBODIMENTS

EXAMPLE 1

Figure 1:
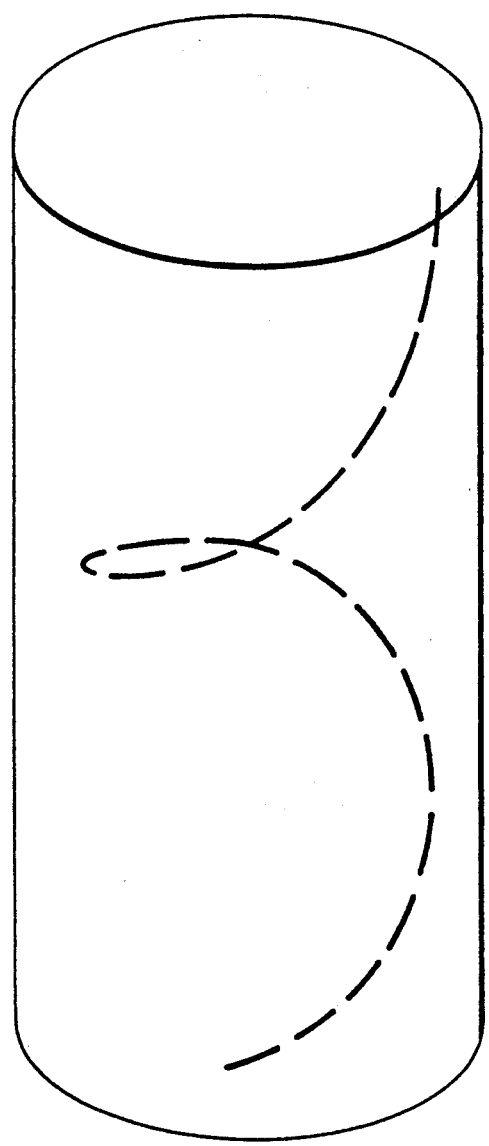
FIG. 1 diagramatically shows the orientation of meat pieces within the product of the present invention.

A beef carcass was boned and the substantially sinewless meat on the carcass, which comprised about 85% by weight of the meat, was passed through a mincer having a plate carrying 12mm diameter holes. The sinewed meat comprising the remainder of the meat from the carcass was passed through a mincer having a plate carrying 8mm diameter holes. The two minced meats were mixed together and again passed through the mincer carrying the plate having 12mm holes.

The combined minced meat product was then passed through a machine as described in PCT Patent Specification PCT/AU86/00163, now U.S. Pat. No. 4,815,165. The product therefrom was fed into a cylinder of 100mm diameter. After the container was filled it was frozen.

As is described in the referenced specification the meat is torn apart into elongate pieces between shredding roller blades rotating at different speeds and is fed through a rotating auger into a cylindrical container having a diameter of 100mm which is slidably disposed on the auger. The rotating auger carries at its free end a comb which engages with the meat pieces as they leave the auger and pass into the cylindrical container and sweeps them along a circular path. The meat pieces passing from the auger into the container pack into the bottom of the container and gradually push the container. This movement of the container combined with the circular movement imparted to the meat pieces causes them to assume a helical array in the container.

The majority of the meat pieces were found to be arranged in the product in a helical array about the longitudinal axis of the product. The individual meat pieces were found to be elongated and of a rough or stringy nature due to their passage between the rotating blades of the machine described in PCT/AU86/00163.

EXAMPLE 2

The process of Example 1 was repeated but incorporating in the meat prior to putting it into the machine as described in PCT Patent Specification PCT/AU86/00163 a number of pieces of black string of about 200mm length.

After being frozen and thawed the product was examined. It was found that the majority of the pieces of string were helically arranged in the product about its longitudinal axis.

The drawing annexed hereto shows diagrammatically the orientation of some of these pieces of black string within the product. The orientation of the pieces of black string within the product corresponds to the orientation of the meat pieces within that product.

I claim:

1. A reconstituted meat product comprising a plurality of meat pieces agglomerated together, wherein the meat pieces are elongate in form and arranged in a substantially helical array through the meat product.

2. A meat product as claimed in claim 1, in which from 40 to 70% of the number of meat pieces in the product are so arranged therein that they have a minimum angle of from 10° to 50° relative to the axis of the helical array.

3. A meat product as claimed in claim 1, in which the meat pieces have a length of from 10mm to 100mm and a transverse dimension of from 2mm to 70mm.

4. A meat product as claimed in claim 3, in which the elongated meat pieces are mixed with a finely comminuted meat material which is not itself elongated.

5. A meat product as claimed in claim 4, in which the finely comminuted meat material contains sinews which have been rendered substantially organoleptically undetectable.

6. A meat product as claimed in claim 1, in which the surface of individual meat pieces has been rubbed or otherwise roughened prior to being agglomerated together.

* * * * *